US012638350B2

(12) United States Patent
Strait et al.

(10) Patent No.: US 12,638,350 B2
(45) Date of Patent: May 26, 2026

(54) SYSTEMS AND METHODS FOR IDENTIFYING MIS-ALIGNED HOLES IN STRUCTURAL COMPONENTS

(71) Applicant: THE BOEING COMPANY, Arlington, VA (US)

(72) Inventors: Alexander Keith Strait, Seattle, WA (US); Andreas Bartl, Munich (DE); Seth Albert Yakel, Seattle, WA (US); Kwok-Tung Chan, Mercer Island, WA (US); Donald Joe Best, III, Stanwood, WA (US); Victor Singh, Seattle, WA (US)

(73) Assignee: The Boeing Company, Arlington, VA (US)

( * ) Notice: Subject to any disclaimer, the term of this patent is extended or adjusted under 35 U.S.C. 154(b) by 294 days.

(21) Appl. No.: 18/484,501

(22) Filed: Oct. 11, 2023

(65) Prior Publication Data

US 2025/0123168 A1 Apr. 17, 2025

(51) Int. Cl.
*G01L 5/16* (2020.01)
*B23B 49/00* (2006.01)

(52) U.S. Cl.
CPC ............... *G01L 5/16* (2013.01); *B23B 49/00* (2013.01)

(58) Field of Classification Search
CPC ... B23B 51/105; B23B 2247/08; B23B 49/06; B23B 49/04; G01B 21/14; G01B 21/22; G01B 21/24; G01B 7/30; G01B 7/31; G01B 5/252; B23Q 17/2471; B23Q 17/0966; B23Q 17/099; B25J 13/085; G01L 5/16
See application file for complete search history.

(56) References Cited

U.S. PATENT DOCUMENTS

| | | | | | |
|---|---|---|---|---|---|
| 3,986,010 | A | * | 10/1976 | Lankford ........... | G05B 19/4163 |
| | | | | | 700/192 |
| 4,601,618 | A | * | 7/1986 | McEldowney .......... | B23Q 3/18 |
| | | | | | 408/82 |
| 4,627,169 | A | * | 12/1986 | Zafred ..................... | B23Q 1/36 |
| | | | | | 33/642 |
| 4,745,681 | A | * | 5/1988 | Hollis, Jr. ............ | B25J 17/0208 |
| | | | | | 901/45 |
| 4,866,429 | A | * | 9/1989 | Granere ................. | B21D 55/00 |
| | | | | | 340/665 |

(Continued)

OTHER PUBLICATIONS

U.S. Appl. No. 18/321,026, filed May 22, 2023.

(Continued)

*Primary Examiner* — Tran M. Tran
(74) *Attorney, Agent, or Firm* — Joseph M. Butscher; Carroll, Hoette & Butscher, LLC

(57) ABSTRACT

A system includes a control unit configured to receive one or more force signals from one or more force sensors coupled to one or both of a tool or an end effector. The one or more force signals are indicative of one or more forces exerted in relation to the tool or the end effector as the tool operates on one or more components to form an expanded hole. The control unit is further configured to compare the one or more forces in relation to force data associated with a reference expanded hole that is aligned with an alignment hole of the one or more components. The control unit is further configured to determine that the expanded hole caused a deformation when the one or more forces differ from the force data.

22 Claims, 17 Drawing Sheets

(56) References Cited

U.S. PATENT DOCUMENTS

| | | | | |
|---|---|---|---|---|
| 5,746,003 | A * | 5/1998 | Baruchello | G01B 5/08 |
| | | | | 33/542 |
| 7,206,657 | B2 * | 4/2007 | Esterling | G05B 19/4065 |
| | | | | 702/41 |
| 7,614,159 | B2 * | 11/2009 | Kilwin | B23B 35/00 |
| | | | | 33/645 |
| 8,021,089 | B2 * | 9/2011 | Eriksson | B23B 47/287 |
| | | | | 408/97 |
| 9,061,419 | B2 * | 6/2015 | Kranz | B25J 9/1633 |
| 9,533,359 | B2 * | 1/2017 | Carberry | B25J 9/1682 |
| 9,839,982 | B2 * | 12/2017 | Ando | B23Q 17/0961 |
| 9,864,362 | B2 * | 1/2018 | Wunderlich | G05B 19/4065 |
| 10,118,714 | B2 * | 11/2018 | Reid | B64F 5/10 |
| 10,179,386 | B2 * | 1/2019 | Khosla | B23Q 17/0966 |
| 10,180,367 | B2 * | 1/2019 | Khosla | G01L 5/0066 |
| 10,386,536 | B2 * | 8/2019 | Hartmann | G01V 13/00 |
| 10,399,199 | B2 * | 9/2019 | Carberry | B25J 19/022 |
| 10,532,438 | B2 * | 1/2020 | Pereira | B23B 35/00 |
| 10,589,394 | B2 * | 3/2020 | Wanner | B25J 15/25 |
| 10,775,251 | B2 * | 9/2020 | Jeng | G01B 5/25 |
| 10,996,649 | B2 * | 5/2021 | Abdallah | G05B 19/402 |
| 11,480,428 | B2 * | 10/2022 | Schasteen, Jr. | G01L 25/00 |
| 11,511,443 | B2 * | 11/2022 | Crivella | B25J 15/0683 |
| 11,992,886 | B2 * | 5/2024 | Blanco | B25J 11/005 |
| 12,030,147 | B2 * | 7/2024 | Sakai | B25J 11/005 |
| 12,220,751 | B2 * | 2/2025 | Cochrane | B23B 31/4006 |
| 12,226,912 | B2 * | 2/2025 | Takeuchi | B25J 9/1687 |
| 12,298,733 | B2 * | 5/2025 | Ros Vega | B25J 15/0095 |
| 12,379,267 | B2 * | 8/2025 | Suresh | G01L 1/2262 |
| 2006/0048364 | A1 * | 3/2006 | Zhang | B23Q 17/0966 |
| | | | | 29/709 |
| 2013/0039709 | A1 | 2/2013 | Goh | |
| 2015/0234375 | A1 * | 8/2015 | Takayama | G05B 19/4086 |
| | | | | 901/41 |
| 2016/0091885 | A1 * | 3/2016 | Toyoda | G05B 19/19 |
| | | | | 700/192 |
| 2018/0126509 | A1 | 5/2018 | Pereira | |
| 2018/0215054 | A1 * | 8/2018 | Brudniok | B25J 19/02 |
| 2022/0331975 | A1 | 10/2022 | Cochrane | |
| 2023/0004152 | A1 * | 1/2023 | Wunderlich | G05B 23/0229 |
| 2025/0205895 | A1 * | 6/2025 | Holden | B25J 13/089 |

OTHER PUBLICATIONS

Extended European Search Report for EP 24200625.2-1201, dated Feb. 14, 2025.
Von Drigalski, et al: "Vibration-Reducing End Effector for Automation of Drilling Tasks in Aircraft Manufacturing," IEEE Robotics and Automation Letters, IEEE, vol. 2, No. 4 (2017).

* cited by examiner

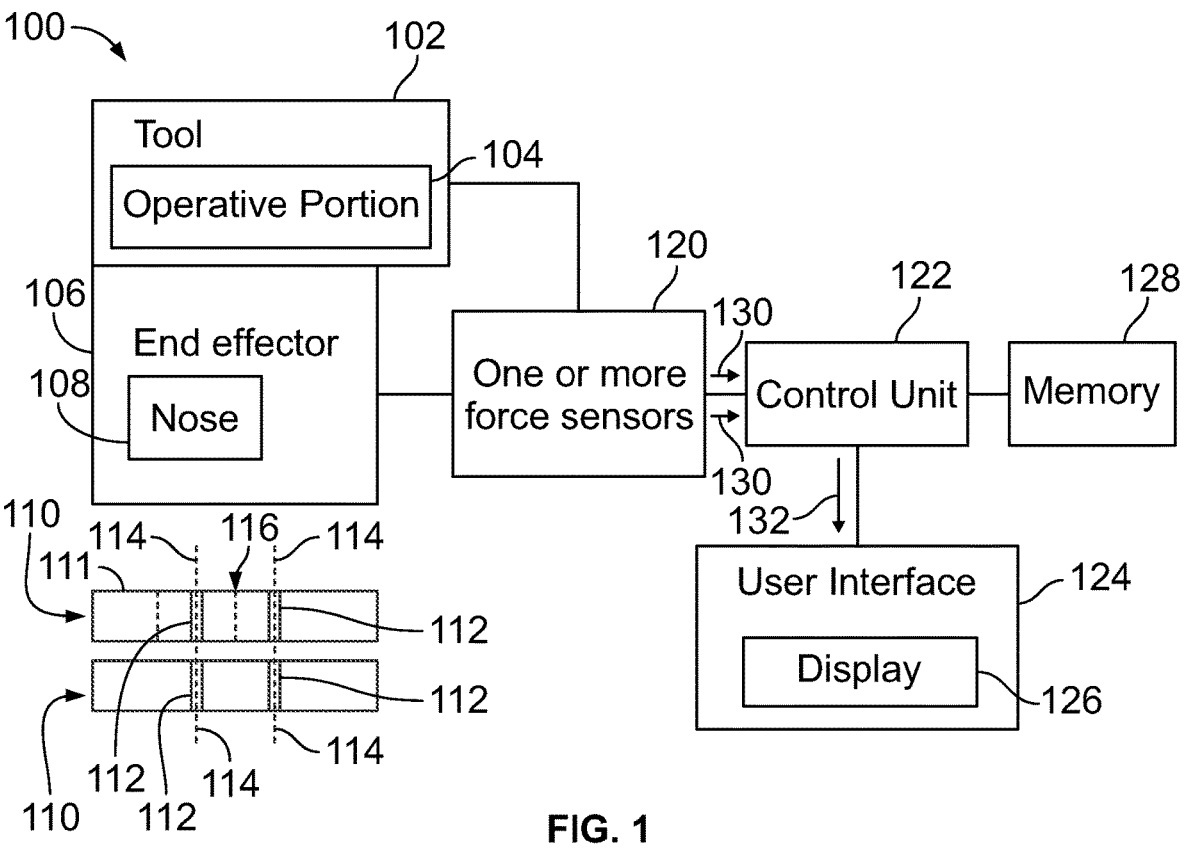
FIG. 1
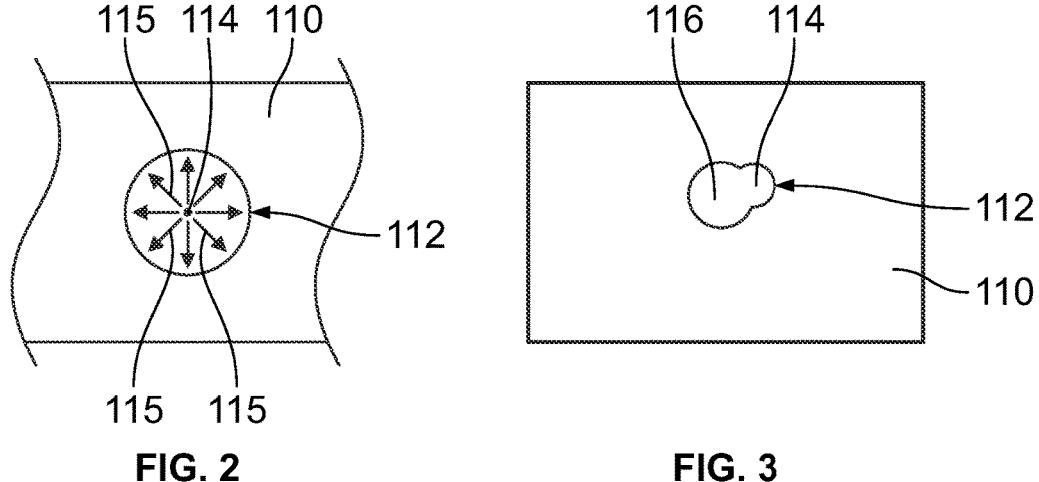
FIG. 2          FIG. 3

Polar Plot

Operate tool to move operative portion into an alignment hole of a component ⟋200

Receive force signals from force sensor(s) ⟋202

Compare force signals with force data ⟋204

208

Expanded hole formed by tool is acceptable

NO

Differ? ⟋206

YES

Expanded hole caused a deformation ⟋210

Output alert ⟋212

106

108

109

SYSTEMS AND METHODS FOR IDENTIFYING MIS-ALIGNED HOLES IN STRUCTURAL COMPONENTS

FIELD OF THE DISCLOSURE

Examples of the present disclosure generally relate to systems and methods for identifying mis-aligned holes, such as out-of-tolerance drilled holes, in structural components.

BACKGROUND OF THE DISCLOSURE

During a manufacturing process, various components can be coupled together. Different components can be coupled together, and operated on by a tool. As an example, during a manufacturing process of an aircraft, outer skin portions of wings are secured to spars, ribs, or the like.

As two parts are assembled together, undersized pilot holes (such as can be applied at a part level or when the two parts are located together) are often utilized to align and/or temporarily attach the parts together. The pilot holes are then used for match drilling and fastening. Pilot holes can be upsized to a larger diameter via resynchronization or relocation. If a drill is not centered on a pilot hole, a drilling operation generates a deformation such as holes that are elongated, "snow-manned," "eyebrowed," "double-drilled," and/or the like.

Typically, holes are manually inspected to determine if any deformations are present. As can be appreciated, such process is time and labor intensive. Further, it has been found that known automated probe inspection systems may not accurately identify hole deformations.

SUMMARY OF THE DISCLOSURE

A need exists for an efficient, effective, and accurate system and method for identifying deformations in formed holes of components.

With that need in mind, certain examples of the present disclosure provide a system including a control unit configured to receive one or more force signals from one or more force sensors coupled to one or both of a tool or an end effector. The one or more force signals are indicative of one or more forces exerted in relation to the tool or the end effector as the tool operates on one or more components to form an expanded hole. The control unit is further configured to compare the one or more forces in relation to force data associated with a reference expanded hole that is aligned with an alignment hole of the one or more components. The control unit is further configured to determine that the expanded hole caused a deformation when the one or more forces differ from the force data.

In at least one example, the system includes the one or more force sensors, and/or one or both of the tool or the end effector. The tool can be a drill.

In at least one example, the one or more sensors include a first force sensor coupled to the tool, and a second force sensor coupled to the end effector.

The system can also include a user interface having a display. The control unit is further configured to show information regarding the expanded hole on the display.

The system can also include a memory in communication with the control unit. The force data can be stored in the memory.

In at least one example, the control unit is further configured to automatically operate the tool in response to determining that the expanded hole caused the deformation.

In at least one example, control unit is an artificial intelligence or machine learning system.

Certain examples of the present disclosure provide a method including receiving, by a control unit, one or more force signals from one or more force sensors coupled to one or both of a tool or an end effector, wherein the one or more force signals are indicative of one or more forces exerted in relation to the tool or the end effector as the tool operates on one or more components to form an expanded hole; comparing, by the control unit, the one or more forces in relation to force data associated with a reference expanded hole that is aligned with an alignment hole of the one or more components; and determining, by the control unit, that the expanded hole caused a deformation when the one or more forces differ from the force data.

The method can also include showing, by the control unit, information regarding the expanded hole on a display of a user interface.

The method can also include storing the force data in a memory in communication with the control unit.

The method can also include automatically operating, by the control unit, the tool in response to said determining.

BRIEF DESCRIPTION OF THE DRAWINGS

FIG. 1 illustrates a simplified block diagram of a system, according to an example of the present disclosure.

FIG. 2 illustrates a plan view of an alignment hole formed through a component.

FIG. 3 illustrates a plan view of an expanded hole that is offset from an alignment hole formed through a component.

DETAILED DESCRIPTION OF THE DISCLOSURE

Figure 4A:
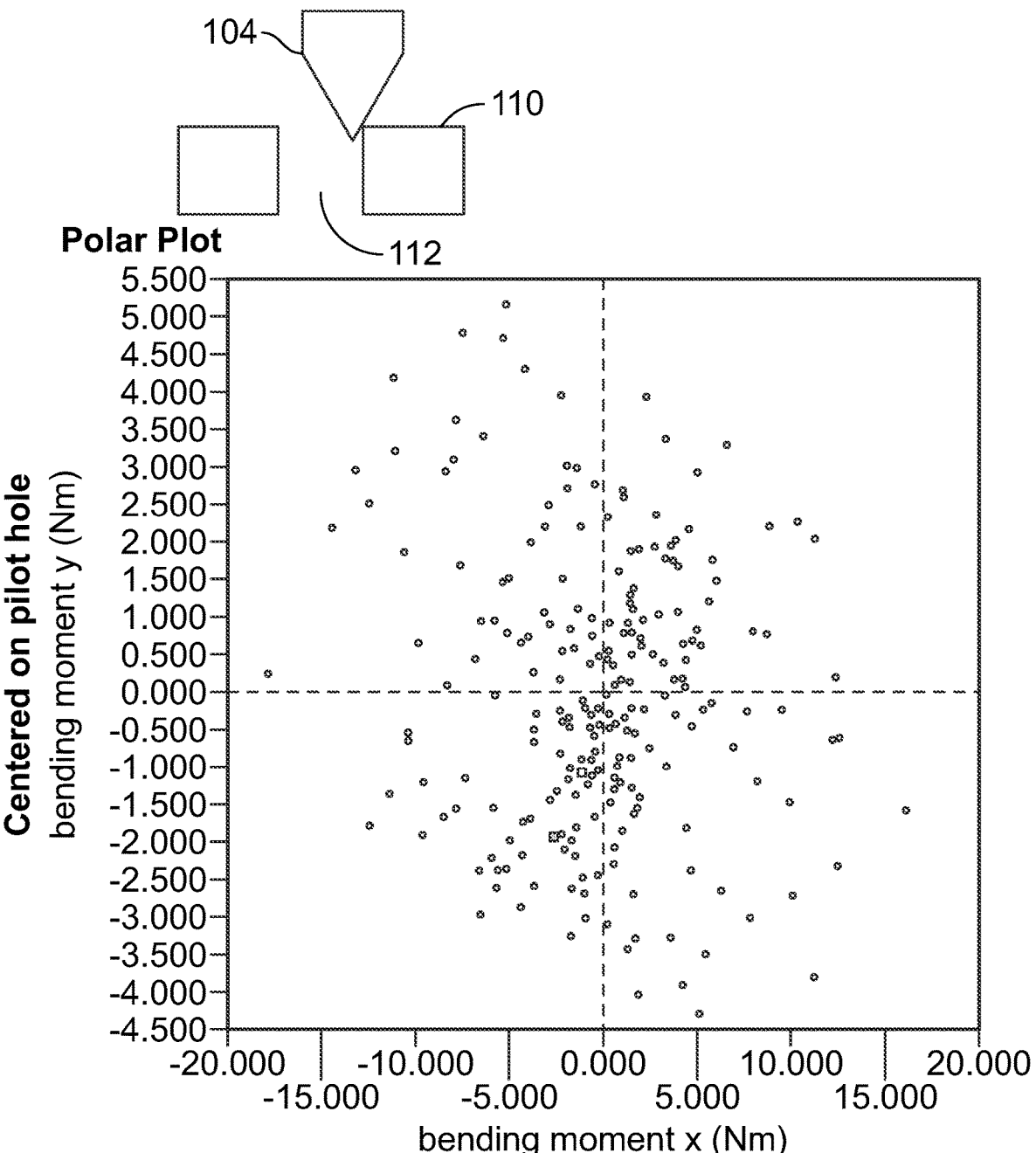
FIG. 4A illustrates polar plots of bending moments of an operative portion of a tool upon initial contact with a component.
Figure 4A:
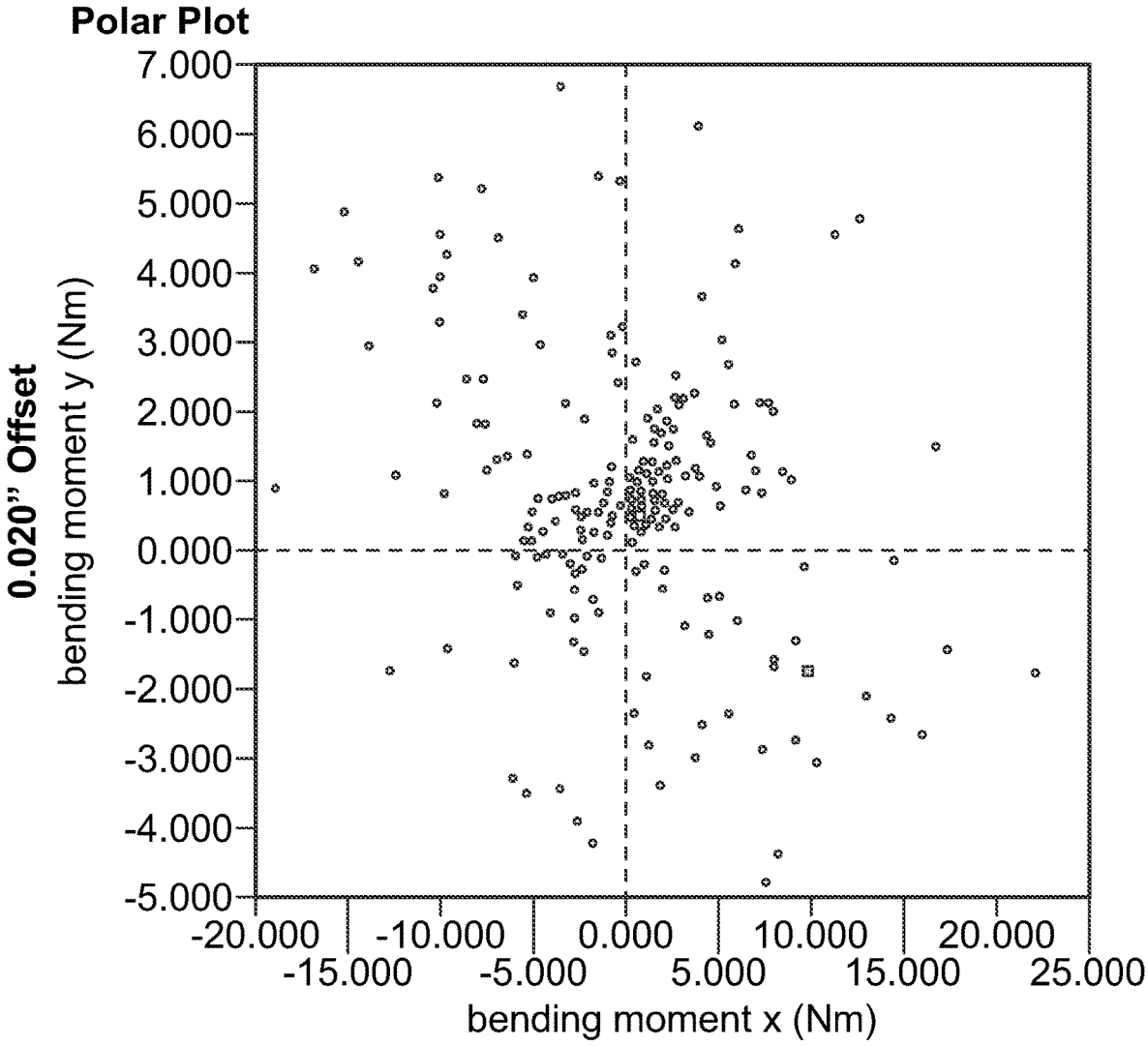
Figure 4A:
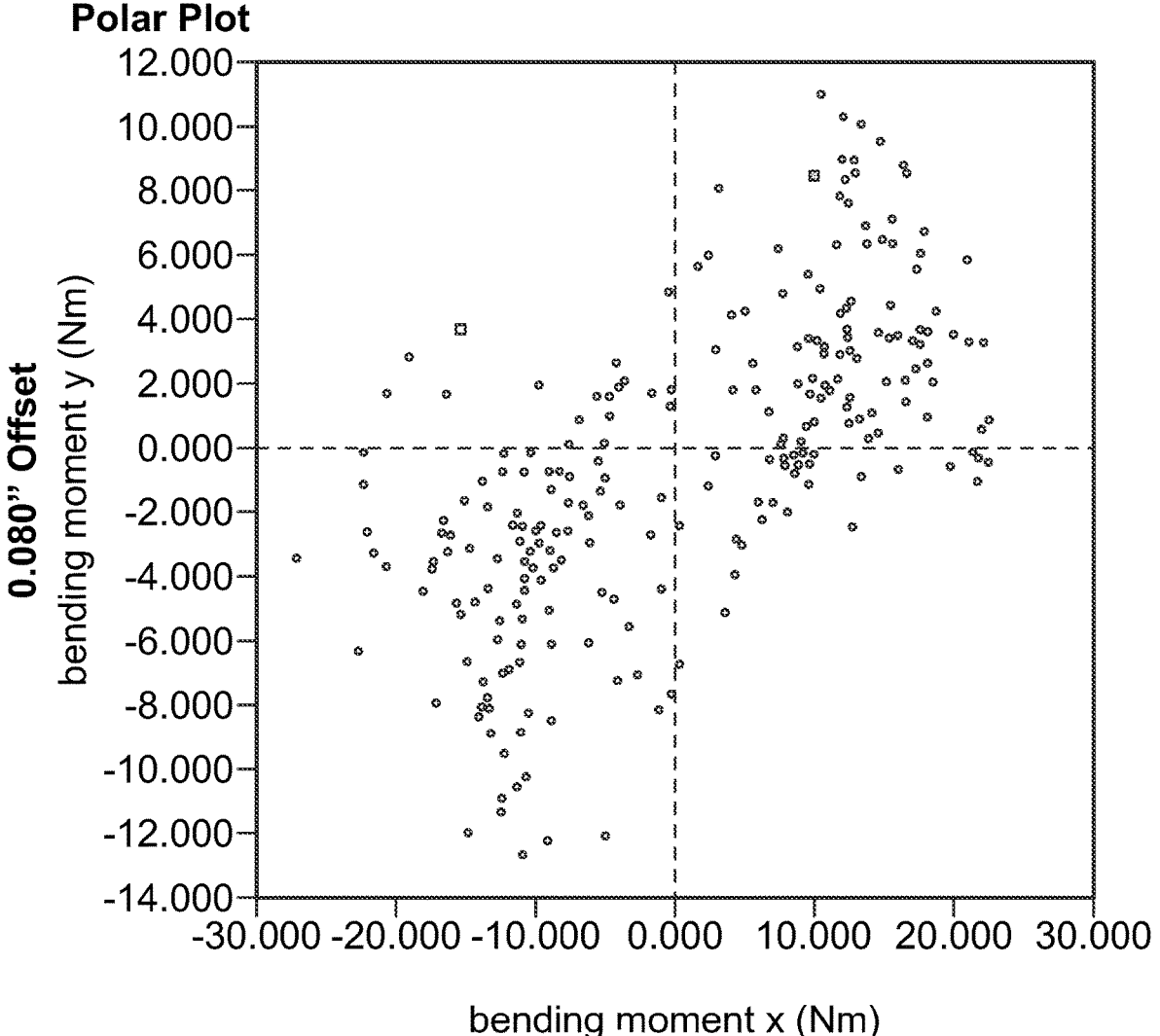
Figure 4A:
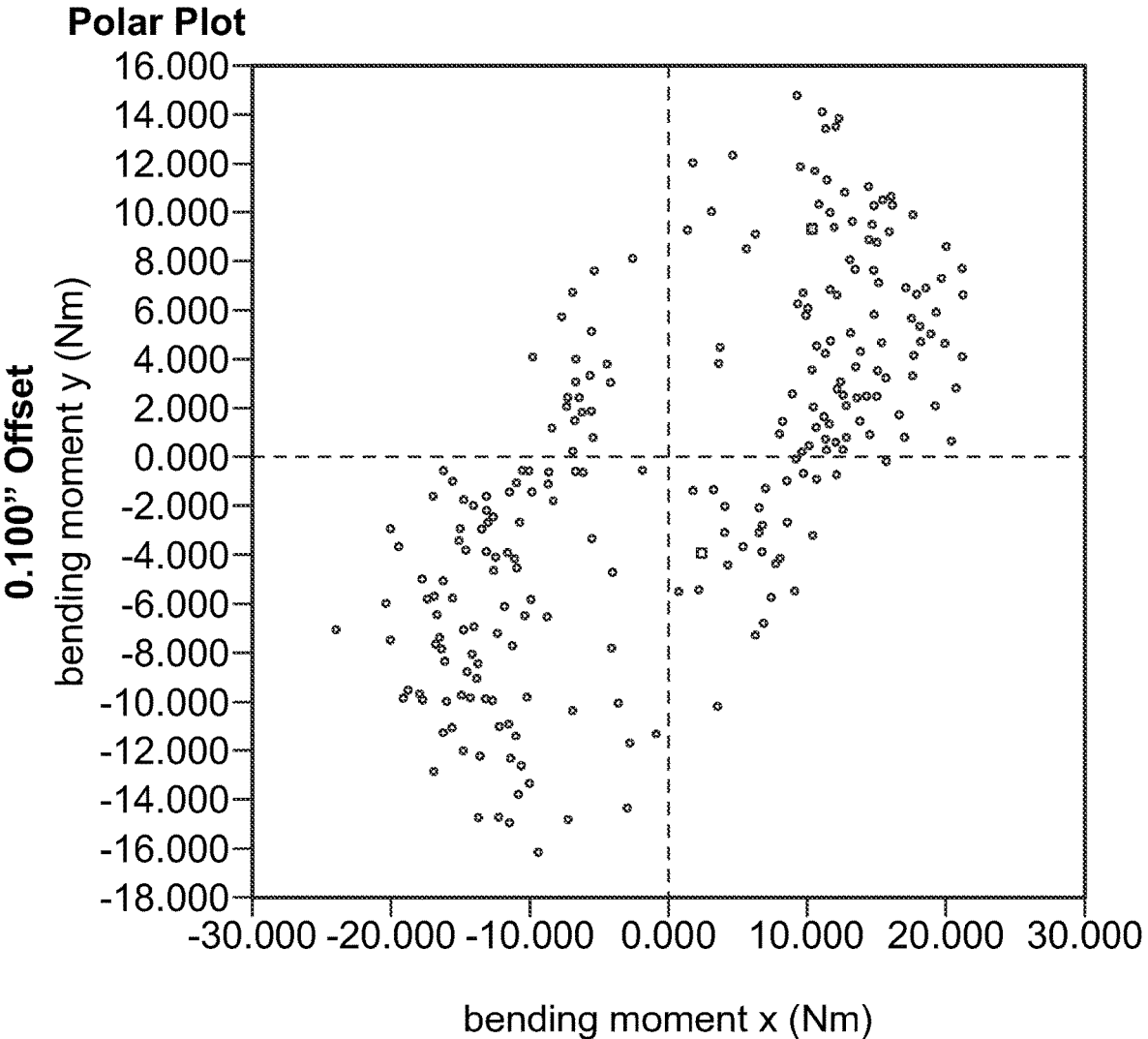

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide systems and methods for detecting out-of-tolerance hole diameters during a tool operation (such as a drilling operation) process based on tool force data. The force load and bending moments on a tool (such as a drill) when contacting material of a component peaks as an operative portion of the tool enters an alignment hole. In at least one example, a control unit analyzes the data from the bending moment to determine a quality of the alignment hole by training networks to identify specific patterns and detect defects. The systems and methods described herein can be used with automatic and semi-automatic drilling systems during assembly operations in order to ensure first pass quality and prevent, minimize, or otherwise reduce unanticipated escapements (that is, holes being formed outside of a predetermined axial alignment).

As an example, the systems and methods described herein can be used during manufacturing of structural components of aircraft, such as in relation to wing panel-to-rib shear tie and panel-to-spar chord locations. The rib shear tie (or spar chord) can have a pre-existing pilot-hole that a tool uses to locate at a panel side prior to drilling a full size hole through the assembly.

In at least one example, a force sensing spindle or tool holder from an end effector platform can be used to acquire axial and radial forces acting on a tool, such as a drill. The system measures radial forces or bending moment from a drill tip, and sends the raw data to a control unit for filtering and statistical analysis. Machine learning can be applied to identify and locate out-of-tolerance holes and mitigate or otherwise reduce false positive events.

FIG. 1 illustrates a simplified block diagram of a system 100, according to an example of the present disclosure. The system 100 includes a tool 102 having an operative portion 104. As an example, the tool 102 is a drill, and the operative portion 104 is a drill bit coupled to a spindle. As another example, the tool 102 is a saw, and the operative portion 104 is a blade. As another example, the tool 102 is a stamping device, and the operative portion 104 is a stamping press. As another example, the tool 102 is a laser forming device, such as a laser cutting device, and the operative portion 104 is a laser beam.

The tool 102 can be operatively coupled to an end effector 106 having a nose 108 (for example, a pressure foot). The operative portion 104 of the tool 102 is configured to fit into and through the nose 108 to operate on one or more components 110. Optionally, the system 100 may not include the end effector 106. Instead, the tool 102 can be configured to operate on the component(s) 110 without the end effector 106.

In at least one example, two components 110 can be aligned with one another. The components 110 can be secured together through fasteners. Each component 110 includes one or more alignment holes 112, such as pilot holes. The alignment holes 112 are used to provide locations for the tool 102 to form expanded holes 116. For example, the operative portion 104 of the tool 102 is configured to be axially aligned with a central longitudinal axis 114 of each alignment hole 112. After alignment, the tool 102 is operated so that the operative portion 104 engages the component 110 around the central longitudinal axis 114 to cut into the material of the component 110 surrounding the alignment hole 112 to form an expanded hole 116 that is configured to receive a fastener, which can be used to secure the component 110 to another structure, such as another component 110.

Each component 110 can be a panel, block, wall, sheet, bracket, connector, or the like. In at least one example, a first component 110 can be a skin of a wing of an aircraft being manufactured, and a second component can be a shear tie to which the skin is to be secured.

If the tool 102 is not desirably axially aligned with the central longitudinal axis 114 of a hole, a resulting expanded hole can be offset and out-of-tolerance. In order to measure an offset hole, one or more force sensors 120 are coupled to one or both of the tool 102, and/or the end effector 106. As an example, a force sensor 120 is coupled to one of the tool 102 or the end effector 106. As another example, a first force sensor 120 is coupled to the tool 102, and a second force sensor 120 is coupled to the end effector 106. The force sensor(s) 120 are configured to detect forces exerted during operation of the tool 102. Examples of the force sensor(s) 120 include load cells, pneumatic load cells, capacitive load cells, strain gages, hydraulic load cells, transducers, and the like. As another example, a force sensor 120 can be coupled to a spindle that is attached to a drill. In this example, the force sensor 120 detects drilling process data, such as torque applied to a component being drilled.

A control unit 122 is in communication with the force sensor(s) 120, such as through one or more wired or wireless connections. The control unit 122 receives force signals 130 indicative of detected forces from the force sensor(s) 120. In at least one example, the control unit 122 can also be in communication with the tool 102 and configured to control operation of the tool 102. Optionally, the control unit 122 is not configured to control operation of the tool 102.

In at least one example, the control unit 122 is also in communication with a user interface 124, which includes a display 126, such as through one or more wired or wireless connections. The user interface 124 can be part of a computer workstation, a handheld device (such as a smart phone or tablet), or the like. The display 126 can be an electronic monitor, a digital display, or the like. As described herein, the control unit 122 can be configured to show information regarding the alignment hole(s) 112 and/or the expanded hole(s) 116 on the display 126.

The control unit 122 is also in communication with a memory 128, such as through one or more wired or wireless connections. The memory 128 can be separate and distinct from the control unit 122. Optionally, the memory 128 can be part of the control unit 122. The memory 128 stores data regarding the component(s) 110, operational characteristics of the tool 102, and/or the like. For example, the memory 128 stores data regarding the materials of the component(s) 110. As another example, the memory 128 stores force data, which can be predetermined. Examples of the force data include a force vector, a force magnitude, patterns, models, trends, and/or the like regarding force(s).

Each material can be characterized by a specific operating force (such as drilling, cutting, or the like), which is used to compute operating forces in models stored in memory. The specific operating force as a material property can be restored from the actually measured operating force, thrust force, motor torque, and/or the like.

In at least one example, the nose 108 abuts into a surface 111 of a component 110. The tool 102 can couple to the end effector 106 such that the operative portion 104 extends through the nose 108 and engages the component 110. The tool 102 provides a tool-operating operation in relation to the component(s) 110. Examples of the tool-operating operation include drilling, cutting, stamping, laser forming, and/or the like.

As the tool 102 operates on the component(s) 110, the force sensor(s) 120 detect forces exerted by the tool 102 and/or on the component(s) 110. For example, the force sensor(s) 120 can detect thrust force exerted by the tool 102 on component(s) 110. As another example, the force sensor(s) 120 can detect torque exerted by the tool 102.

In at least one example, the memory 128 stores predetermined force data (such as force vector(s), force magnitude(s), pattern(s), force model(s), force trend(s), and/or the like) associated with the tool 102 being aligned with the central longitudinal axis 114 and operating on the component 110. For example, the tool 102 can be a drill, and the operative portion 104 is a drill bit that is configured to pass into the hole 112. When the operative portion 104 is axially aligned with the central longitudinal axis 114, the operative portion 104 typically engages consistently with the material of the component 110 radially and axially about the central longitudinal axis 114. In contrast, if the operative portion 104 is offset from the central longitudinal axis 114, a portion of the operative portion 104 engages material of the component 110, but another portion of the operative portion 104 may be disposed within an open space of the hole 112, which thereby causes a bending moment in relation to the operative portion 104 and/or the component 110. The bending moment results in a force that differs from the predetermined force data associated with the tool 102 being aligned with the central longitudinal axis 114 and operating on the component 110.

The control unit 122 analyzes the data (including information regarding detected force) received from the force sensor(s) 120. When then the control unit 122 determines that the data received from the force sensor(s) 120 conforms to the predetermined force data (for example, equals the predetermined force data, and/or is within a predetermined tolerance, such as +/−0.5% or less), the control unit 122 determines that the expanded hole 116 being formed by the tool 102 is aligned with the alignment hole 112. As such, the expanded hole 116 is acceptable. The control unit 122 can then output a resulting formed hole signal 132 to the user interface 124 indicating that the expanded hole 116 is acceptable. The control unit 122 can provide an indication on the display 126 that the expanded hole 116 is acceptable.

In contrast, when the control unit 122 determines that the data received from the force sensor(s) 120 differs from the predetermined force data, the control unit 122 determines that the expanded hole 116 is offset from the central longitudinal axis 114 of the alignment hole 112 (thereby resulting in an expanded hole having a deformation). Thus, the control unit 122 then determines that the resulting expanded hole 116 is offset from the alignment hole 112 (such as out-of-tolerance with the alignment hole 112). The control unit 122 can then output a resulting formed hole signal 132 to the user interface 124 indicating an alert that the expanded hole 116 is offset in relation to the alignment hole 112. The control unit 122 can provide an indication of the alert on the display 126.

The control unit 122 monitors exerted forces via signals received from the force sensor(s) 120 as the tool 102 operates on the component(s) 110. Thus, the control unit 122 monitors the exerted forces on the component(s) 110 and/or the tool 102 throughout a hole-forming process (such as from the time that the operative portion 104 first engages component 110 until the time that the operative portion passes through the component 110).

In at least one example, in response to the control unit 122 determining that the expanded hole 116 is offset in relation to the alignment hole 112 (thereby resulting in the expanded hole 116 having a deformation), the control unit 122 may automatically (that is, without human intervention) operate the tool 102 to cease further operation on the component 110. For example, when the control unit 122 determines that the expanded hole 116 being formed is offset from the alignment hole 112, the control unit 122 may cause the tool 102 to stop further hole formation, and instead control the tool 102 so that the operative portion 104 retreats from the component 110. Optionally, the control unit 122 may not automatically operate the tool 102.

In response to the control unit 122 determine that the expanded hole 116 is offset in relation to the alignment hole 112, in addition to outputting the alert to the user interface 124, the control unit 122 may also output a message to be shown on the display 126. The message can include information instructing the operator to manually inspect component 110, discard the component 110, refrain from inserting a fastener into the expanded hole 116, and/or the like. Optionally, the control unit 122 may not show such message on the display 126.

As described herein, the system 100 includes the control unit 122, which is configured to receive one or more force signals 130 from the force sensor(s) 120, which can be coupled to the tool 102 and/or the end effector 106. The force signal(s) 130 are indicative of one or more forces exerted in relation to the tool 102 or the end effector 106 as the tool operates 102 on the component(s) 110. The control unit 122 is further configured to compare the one or more forces in relation to force data associated with a reference expanded hole (information for which can be stored in the memory 128, and/or determined through machine learning or artificial intelligence) that is axially aligned with an alignment hole 112 of the component(s) 110. The control unit 122 is further configured to determine that the expanded hole 116 caused a deformation when the one or more forces differ from the force data.

FIG. 2 illustrates a plan view of an alignment hole 112 formed through a component 110. As shown, the alignment hole 112 has a central longitudinal axis 114. Referring to FIGS. 1 and 2, when the operative portion 104 is axially aligned with the central longitudinal axis 114 (such as within a predetermined tolerance, such as within 0.01" or less), forces exerted on the operative portion 104 and/or the component 110 as detected by the force sensor(s) 120 are within the predetermined force data. An offset 115 from the central longitudinal axis 114 can be a radial distance from the central longitudinal axis 114. The radial distance can be greater than 0". Optionally, the radial distance can be greater than 0.1" (for example, the predetermined tolerance).

FIG. 3 illustrates a plan view of an expanded hole 116 that is offset from an alignment hole 112 formed through a component 110. Referring to FIGS. 1 and 3, when the expanded hole 116 if offset from the central longitudinal axis 114, the resulting shape of the expanded hole 116 is deformed. As shown in the FIG. 3, the expanded hole 116 is "snow-manned." As the expanded hole 116 shown in FIG. 3 is being formed, the resulting forces exerted onto the operative portion 104 of the tool 102 and/or the component 110, as detected by the force sensor(s) 120, differ from the predetermined force data. The control unit 122 identifies the difference by comparing the force data received from the force sensor(s) 120 with the predetermined force data stored in the memory 128, and therefore identifies that the expanded hole 116 is out of alignment with the alignment hole 112.

Figure 4B:
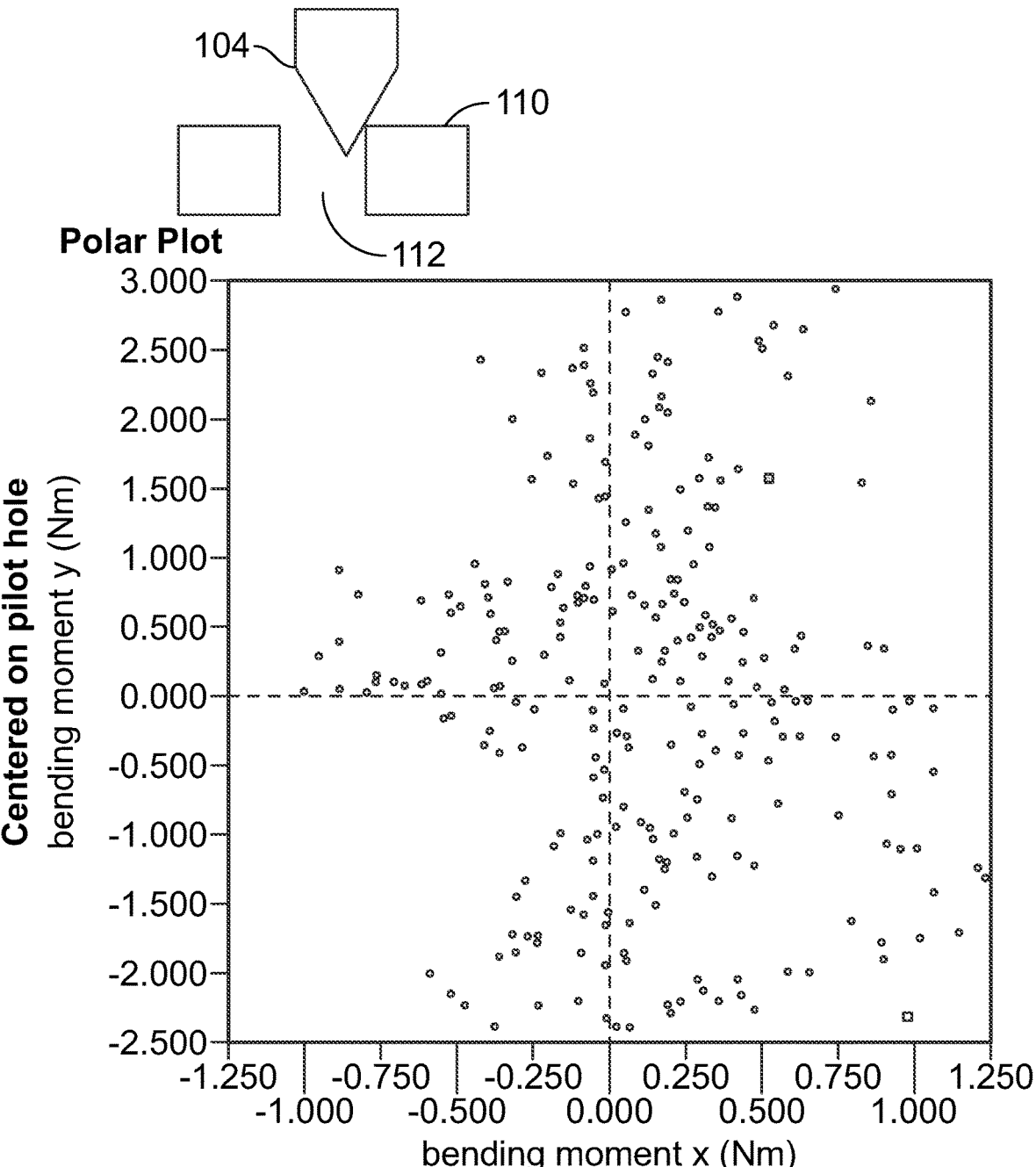
FIG. 4B illustrates polar plots of bending moments of the operative portion of the tool during insertion into an alignment hole of the component.
Figure 4B:
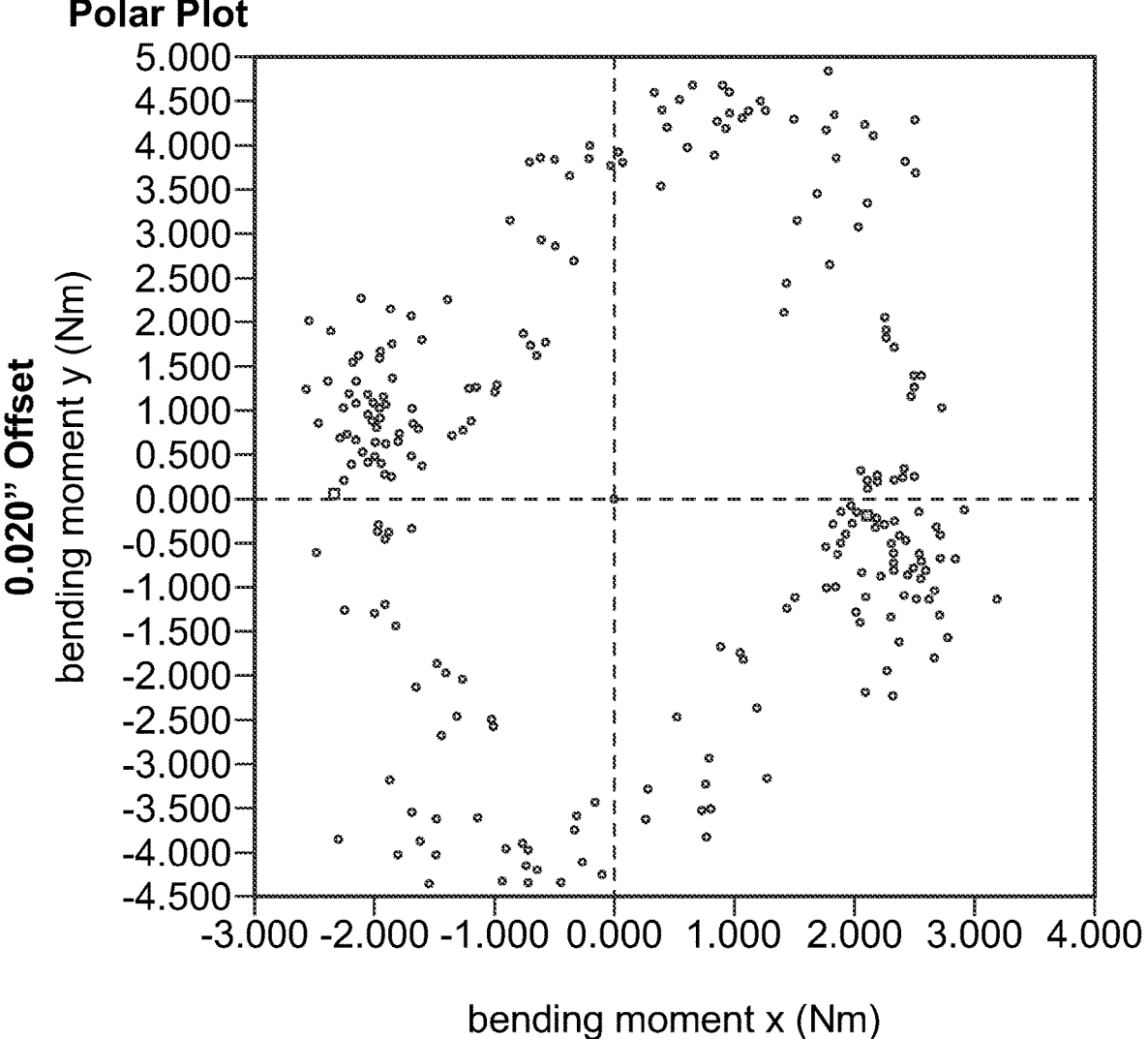
Figure 4B:
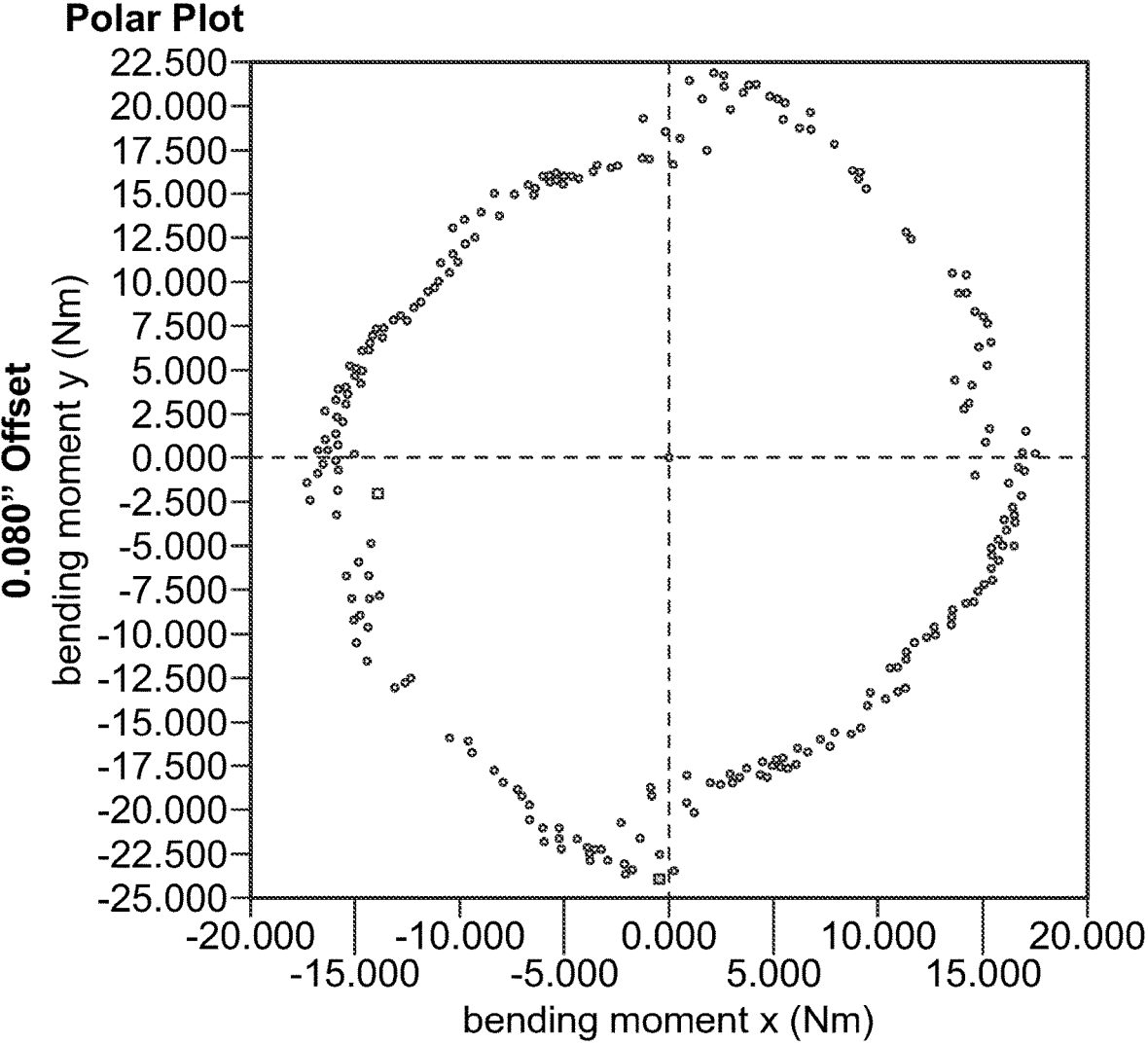
Figure 4B:
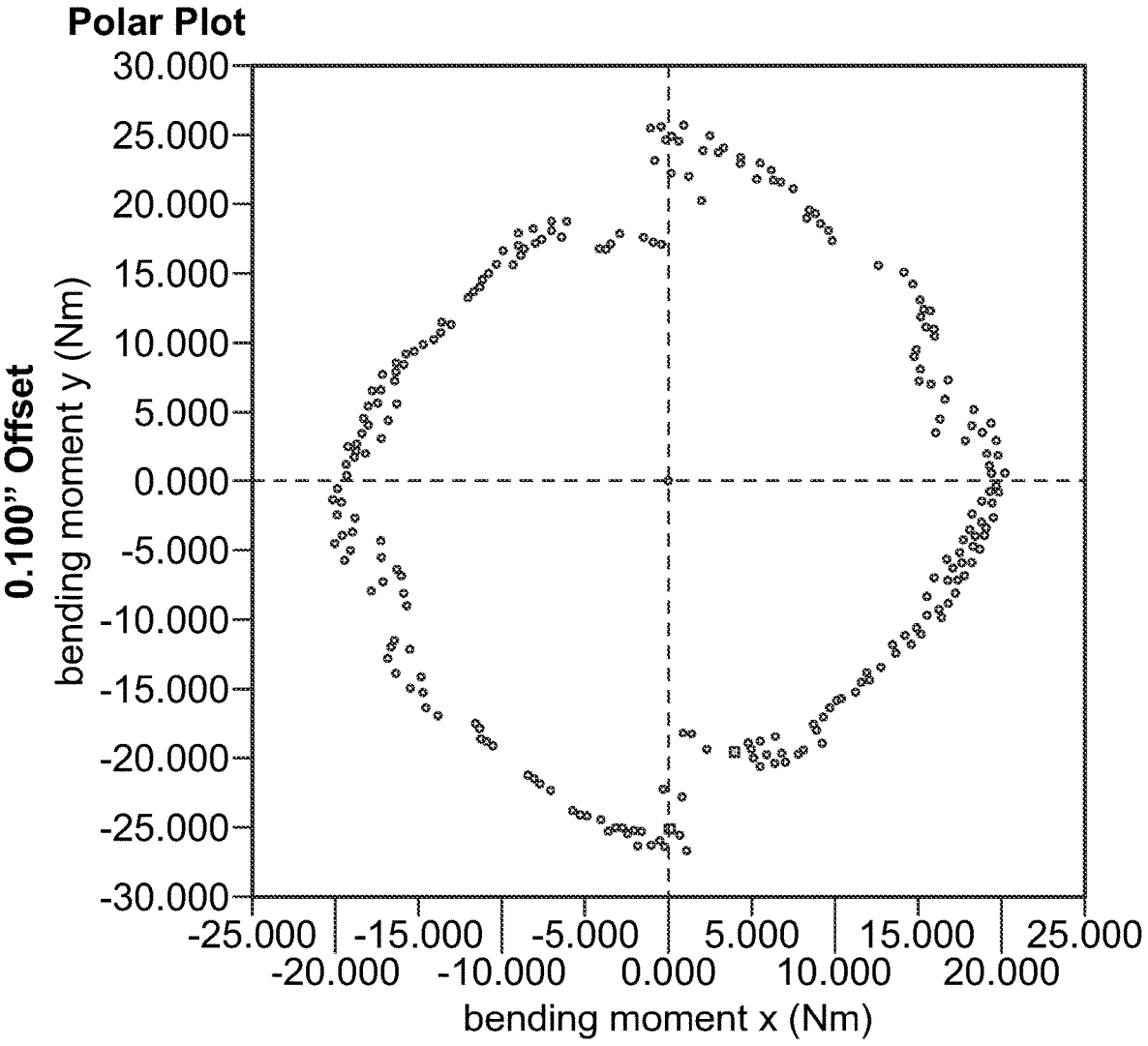
Figure 4C:
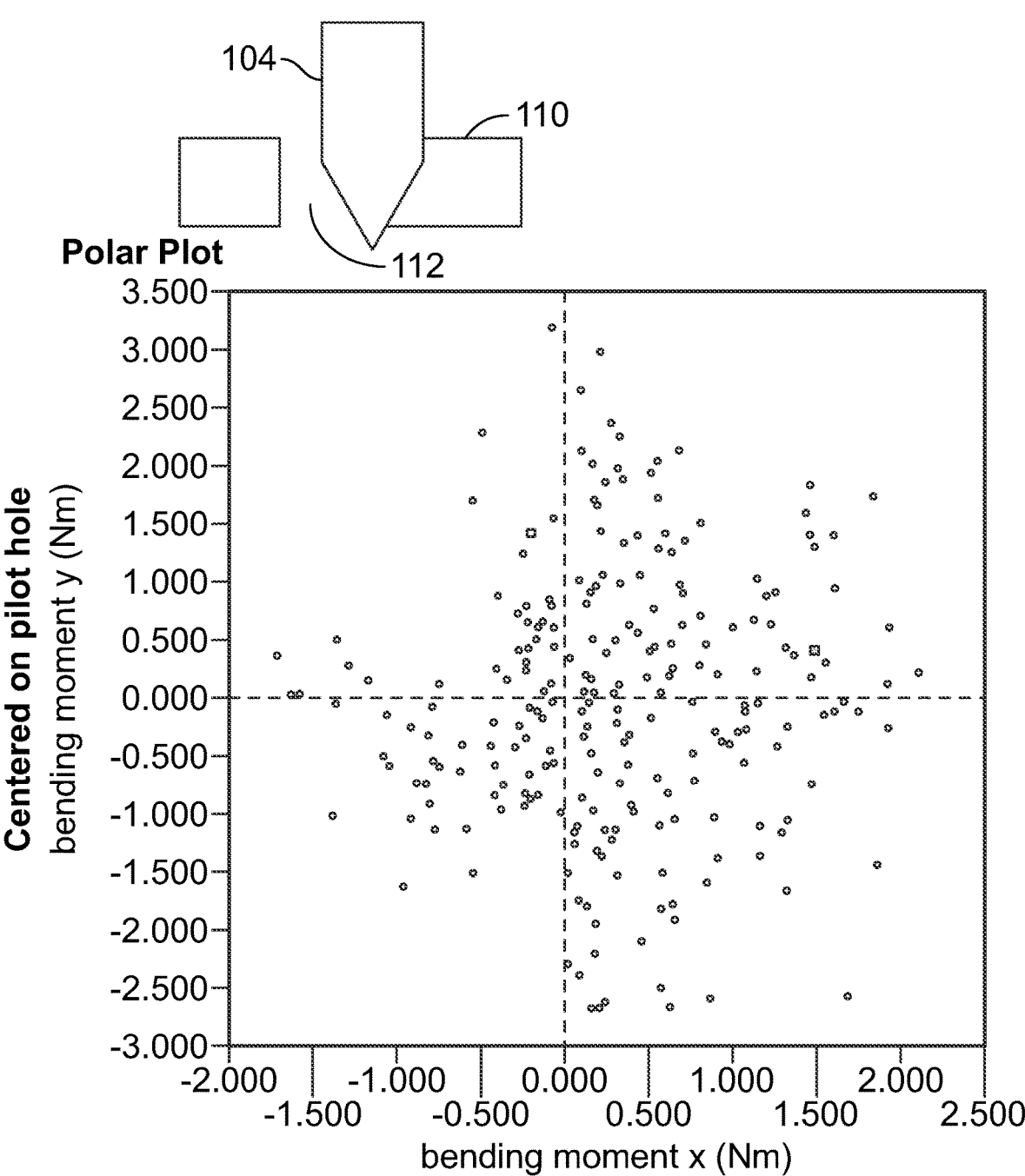
FIG. 4C illustrates polar plots of bending moments of the operative portion of the tool upon passing through the alignment hole of the component.
Figure 4C:
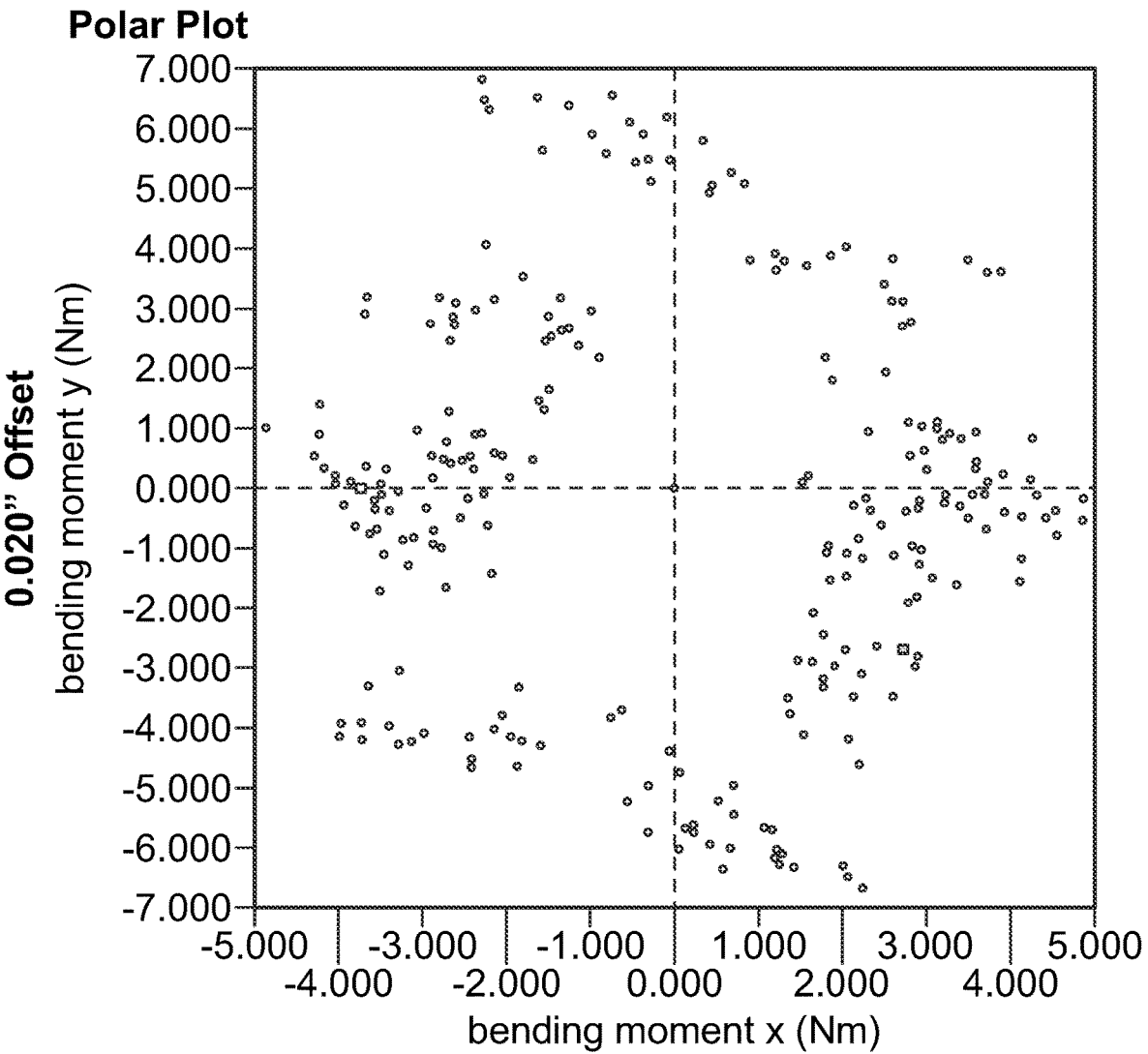
Figure 4C:
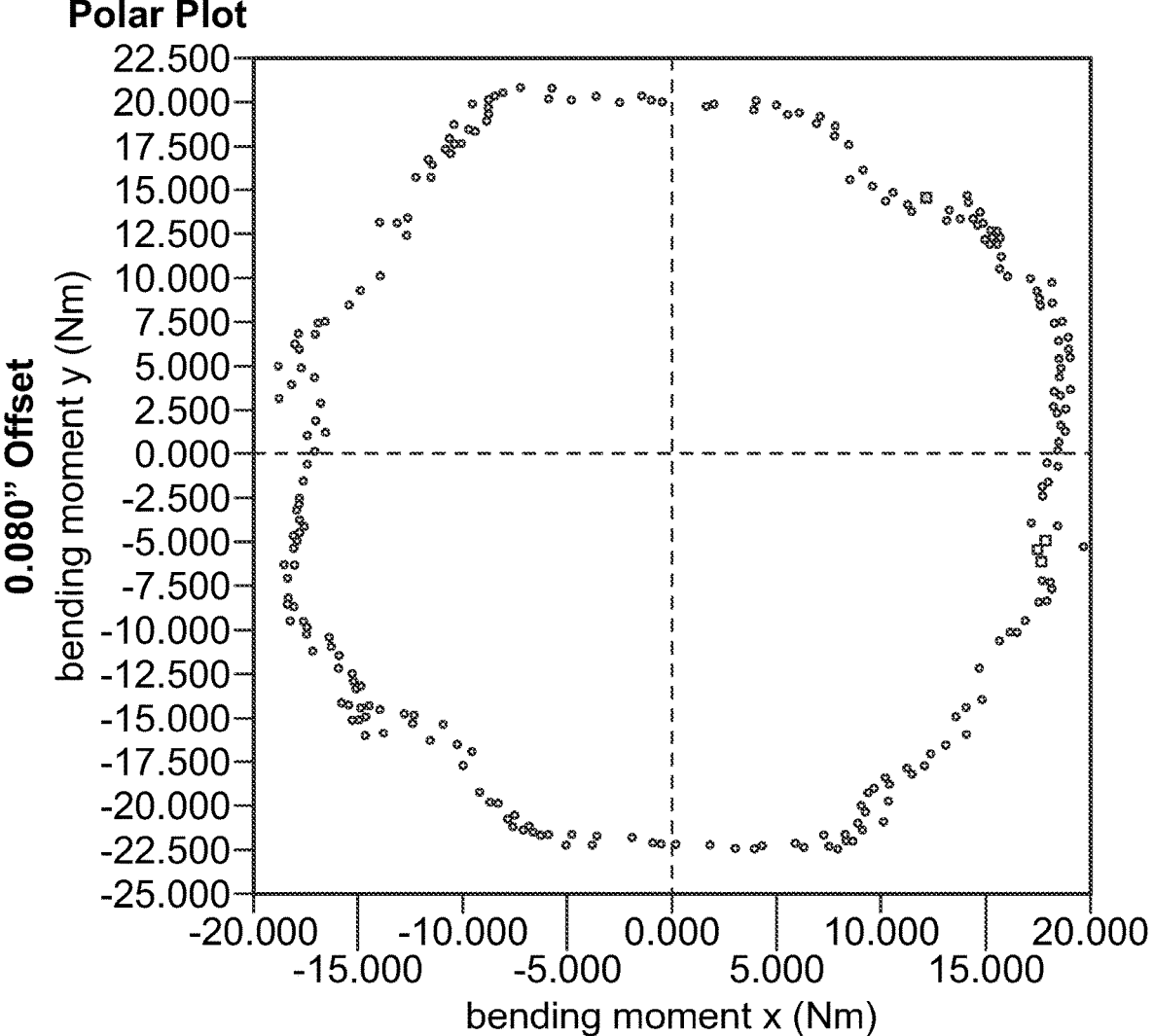
Figure 4C:
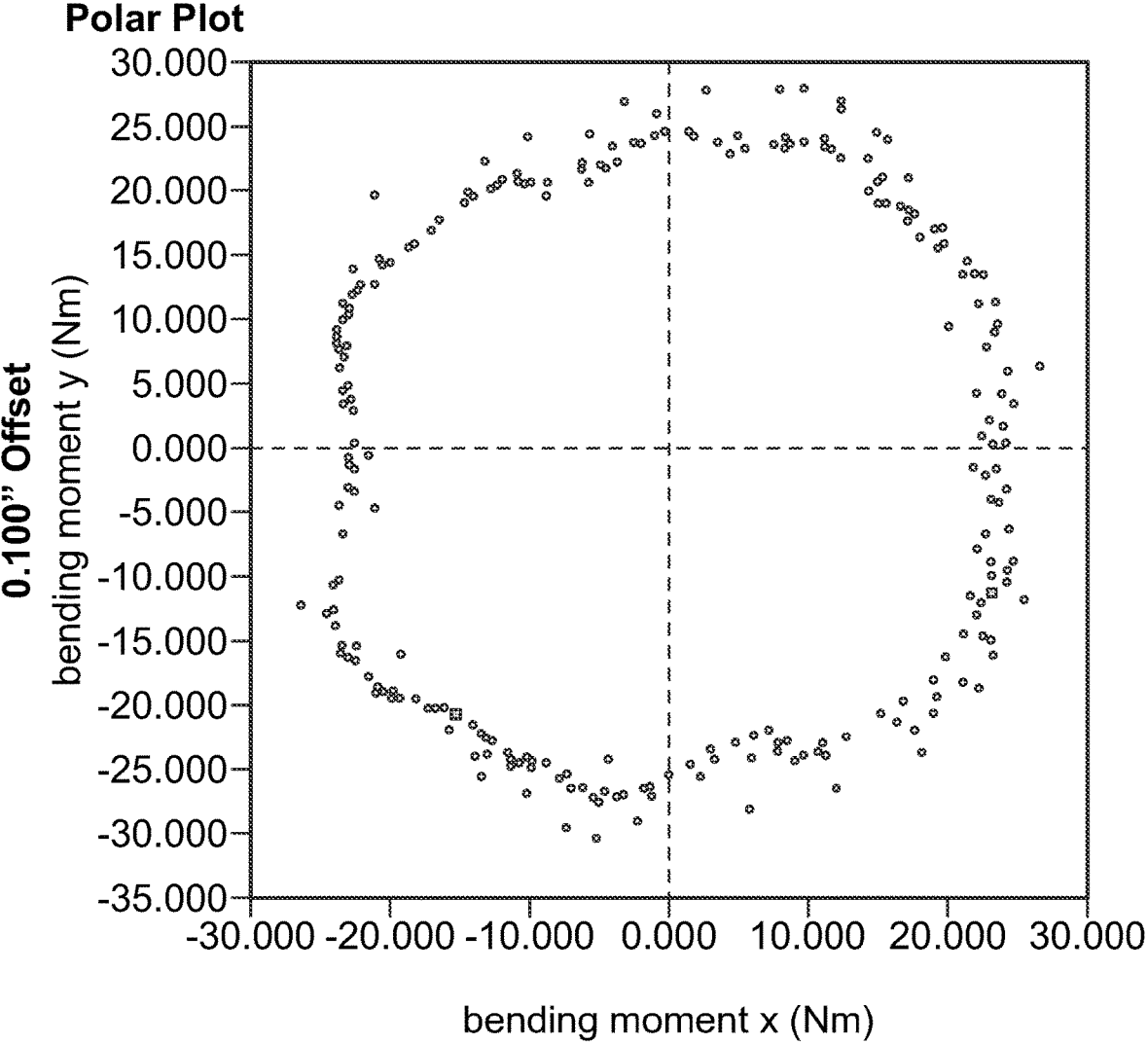

FIG. 4A illustrates polar plots of bending moments of an operative portion 104 of a tool 102 upon initial contact with a component 110. FIG. 4B illustrates polar plots of bending moments of the operative portion 104 of the tool 102 during insertion into an alignment hole 112 of the component 110. FIG. 4C illustrates polar plots of bending moments of the operative portion 104 of the tool 102 upon passing through the alignment hole 112 of the component 110. As shown, the closer the operative portion 104 is aligned with the central longitudinal axis 114 (shown in FIGS. 1-3) of the alignment hole 112, the less organized are the polar plots. In contrast, with increasing offset from the alignment hole 112 (such as 0.02", 0.08", and 0.1"), and with increasing depth of the operative portion 104 within the alignment hole 112, the polar plots become increasingly organized, such as to form a circular shape.

Figure 5:
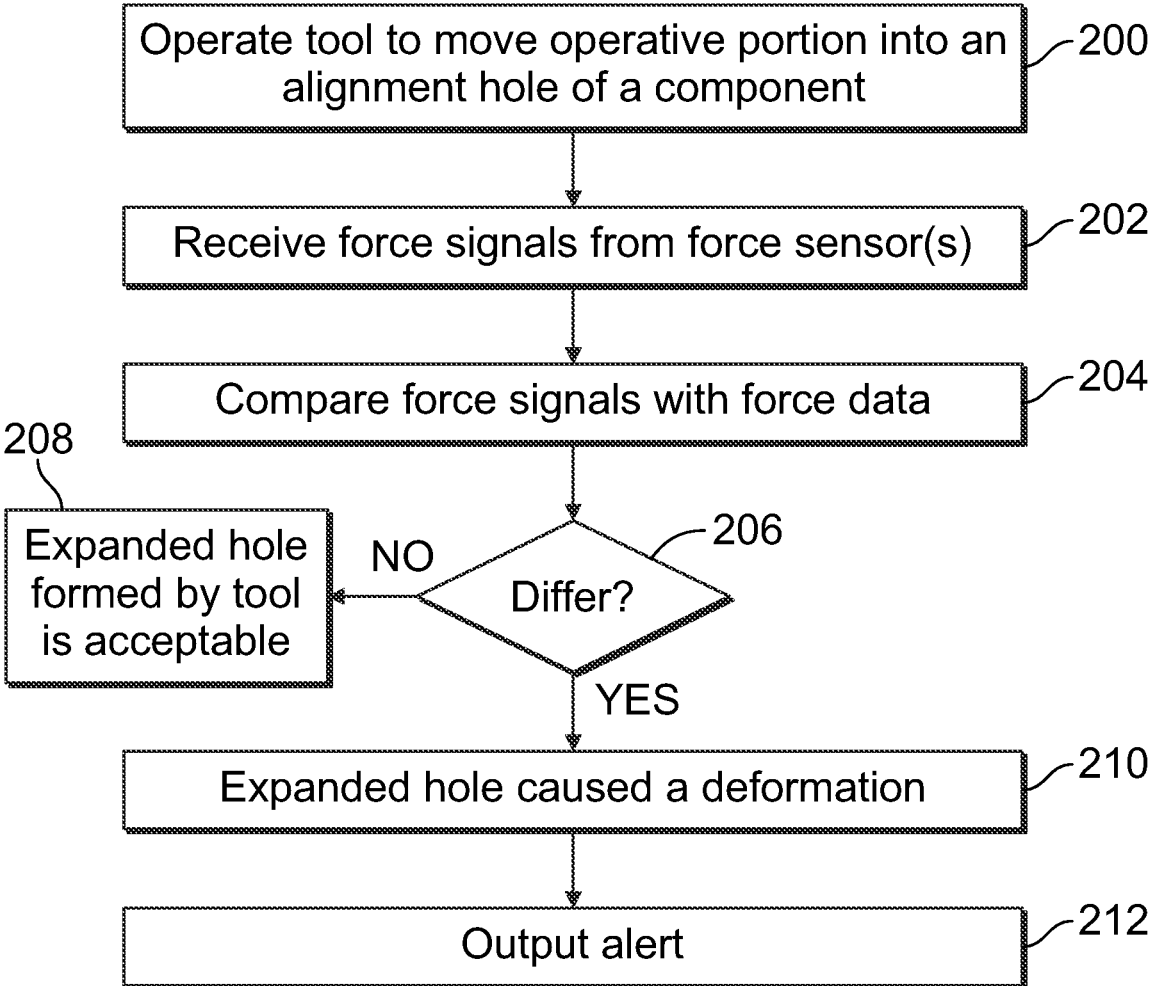
FIG. 5 illustrates a flow chart of a method, according to an example of the present disclosure.

FIG. 5 illustrates a flow chart of a method, according to an example of the present disclosure. Referring to FIGS. 1 and 5, at 200, the tool 102 is operated to move the operative portion 104 (such as a drill bit) into an alignment hole 112 formed in a component 110. At 202, the control unit 122 receives force signals indicative of detected forces (such as being moments exerted into the operative portion 104) from the force sensor(s) 120. At 204, the control unit 122 compares the force signals with force data, such as are related to the operative portion 104 being aligned with the central longitudinal axis 114. At 206, the control unit 122 determines if the received force signal(s) differ from the force data (such as within a predetermined acceptable difference). If the force signal(s) do not differ from the force data, the method proceeds from 206 to 208, at which the control unit 122 determines that the expanded hole 116 formed by the tool 102 is acceptable. If, however, the force signal(s) differ from the force data, the method proceeds from 206 to 210, at which the control unit 122 determines that the expanded hole 116 causes a deformation (such as a "snow-manned," "eyebrowed," "double-drilled," or other such hole). The method can then proceed to 212, at which the control unit 122 outputs an alert to the user interface 124.

In at least one example, instead of, or in addition to 204, the control unit 122 can extract features and/or patterns from force and bending moment data within a force signal received from the force sensor(s) 120. The control unit 122 can compare such information in relation to stored force data. The control unit 122 can compute an offset from a model or mapping, such as within the force data. As noted, the stored force data can include a predetermined force model.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 122 may be or include one or more processors that are configured to control operation, as described herein.

The control unit 122 is configured to execute a set of instructions that are stored in one or more data storage units or elements (such as one or more memories), in order to process data. For example, the control unit 122 may include or be coupled to one or more memories. The data storage units may also store data or other information as desired or needed. The data storage units may be in the form of an information source or a physical memory element within a processing machine.

The set of instructions may include various commands that instruct the control unit 122 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 122 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform the operations of the methods also described herein. For example, the control unit 122 can be an artificial intelligence or machine learning system. In at least one example, the control unit 122, as an AI or machine learning system, can automatically determine the force data described herein, instead of (or in addition to) relying on predetermined force data. These types of systems may be trained from outside information and/or self-trained to repeatedly improve the accuracy with how data is analyzed to determine whether or not an expanded hole 116 is acceptable or not. Over time, these systems can improve by determining shape, force data, and/or the like with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of the data received from the force sensor(s) 120. Based on this feedback, the systems may be trained by adjusting one or more parameters, weights, rules, criteria, or the like, used in the analysis of the same. This process can be performed using the data instead of training data, and may be repeated many times to repeatedly improve the determination of the nature of the expanded holes 116. The training minimizes conflicts and interference by performing an iterative training algorithm, in which the systems are retrained with an updated set of data and based on the feedback examined prior to the most recent training of the systems. This provides a robust analysis model that can better determine the nature of the expanded holes 116 formed by tools 102.

Figure 6:
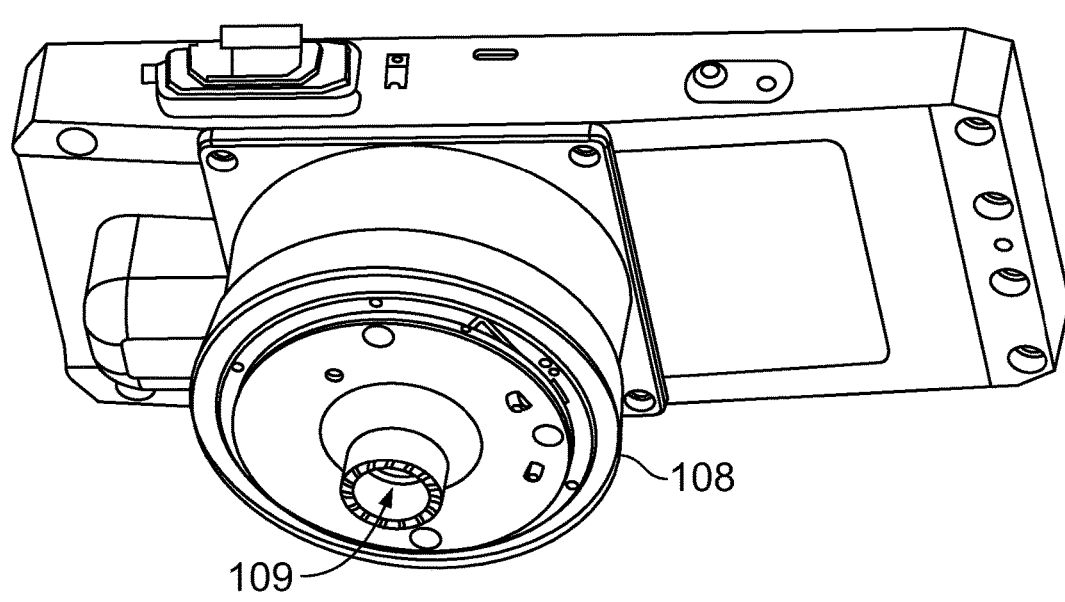
FIG. 6 illustrates a perspective bottom view of an end effector, according to an example of the present disclosure.

FIG. 6 illustrates a perspective bottom view of an end effector 106, according to an example of the present disclosure. The nose 108 is configured to abut against a surface 111 of a component 110 (shown in FIG. 1). For example, the nose 108 is configured to clamp normal to the surface 111. The nose 108 includes an opening 109 that leads to a passage through which the operative portion 104 (such as a drill bit) of the tool 102 (shown in FIG. 1) passes.

Figure 7:
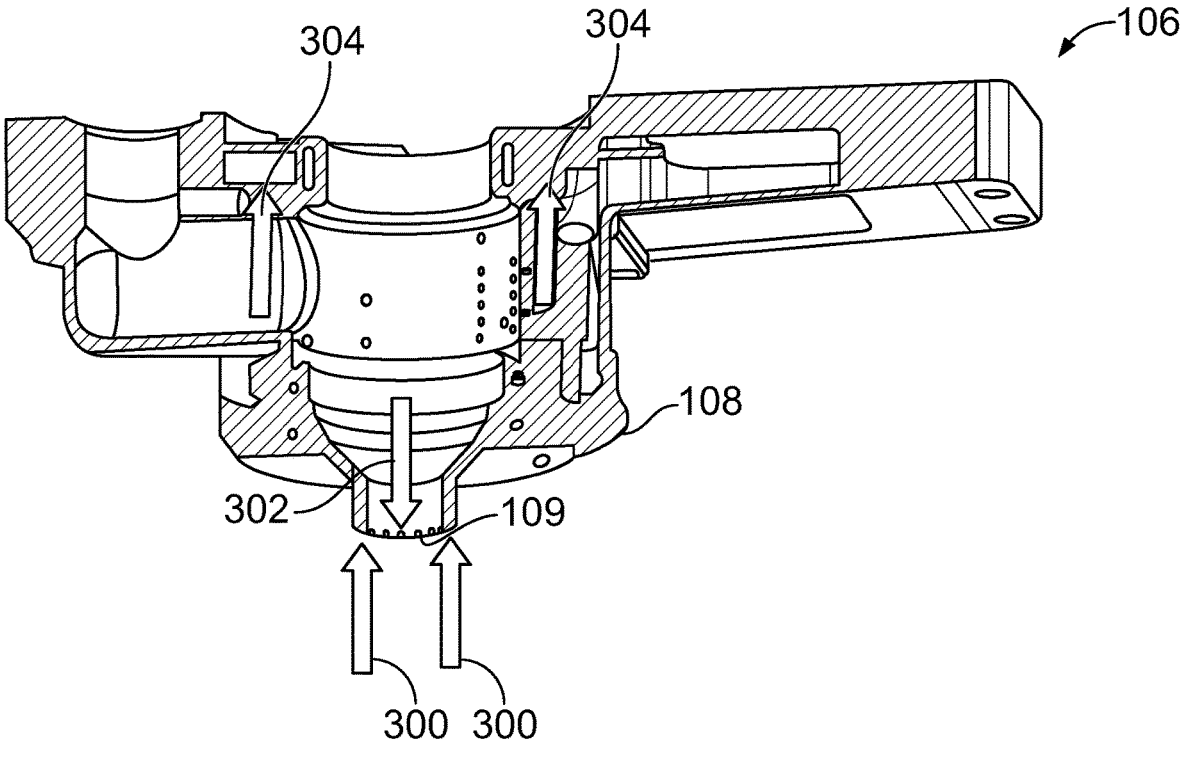
FIG. 7 illustrates a perspective internal view of the end effector of FIG. 4.

FIG. 7 illustrates a perspective internal view of the end effector 106 of FIG. 6. Referring to FIGS. 1-7, a force sensor 120 coupled to the end effector 106 can be a load cell, which is configured to detect a force, such as clamp load 300 exerted into the nose 108 by the first component 110. The force sensor 120, another force sensor, and/or a force sensor coupled to the tool 102 detects a force, such as drill thrust force 302, exerted by the tool 102. The control unit 122 can then determine a measured force 304, such as measured load, by subtracting the drill thrust force 302 from the clamp load 300.

Figure 8:
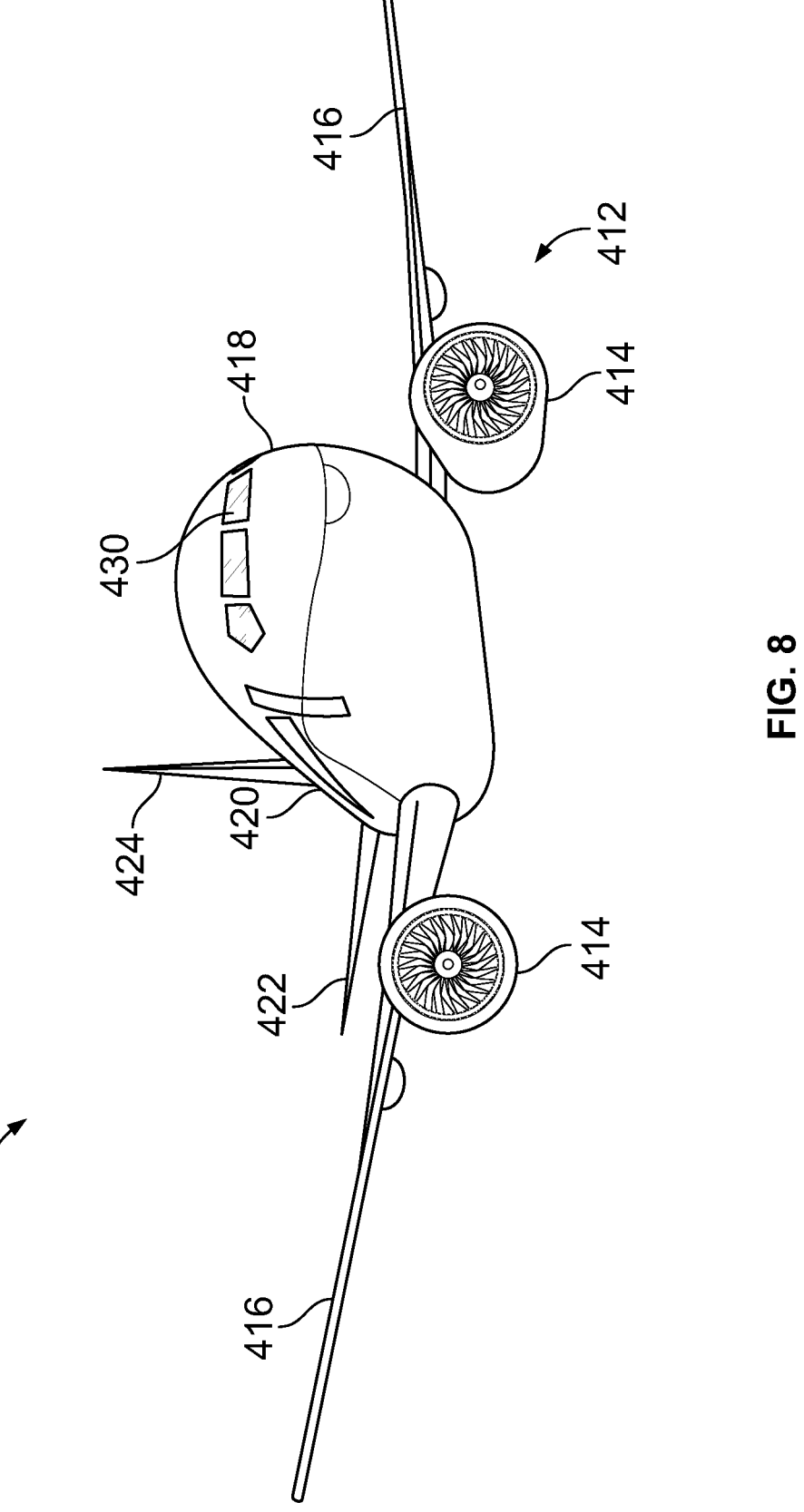
FIG. 8 illustrates a perspective front view of an aircraft, according to an example of the present disclosure.

FIG. 8 illustrates a perspective front view of an aircraft 400, according to an example of the present disclosure. The aircraft 400 includes a propulsion system 412 that includes engines 414, for example. Optionally, the propulsion system 412 may include more engines 414 than shown. The engines 414 are carried by wings 416 of the aircraft 400. In other examples, the engines 414 may be carried by a fuselage 418 and/or an empennage 420. The empennage 420 may also support horizontal stabilizers 422 and a vertical stabilizer 424. The fuselage 418 of the aircraft 400 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. Referring to FIGS. 1-8, examples of the present disclosure can be used during manufacture of various portions of the aircraft 400. For example, skins of wings are components that are secured to other internal components, such as spars, ribs, and the like.

FIG. 8 shows an example of an aircraft 400. It is to be understood that the aircraft 400 can be sized, shaped, and configured differently than shown in FIG. 4. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft. Optionally, examples of the present disclosure can be used with fixed structures, such as residential or commercial buildings.

Further, the disclosure comprises examples according to the following clauses:

Clause 1. A system comprising:

a control unit configured to:

receive one or more force signals from one or more force sensors coupled to one or both of a tool or an end effector, wherein the one or more force signals are indicative of one or more forces exerted in relation to the tool or the end effector as the tool operates on one or more components to form an expanded hole, compare the one or more forces in relation to force data associated with a reference expanded hole that is aligned with an alignment hole of the one or more components, and determine that the expanded hole caused a deformation when the one or more forces differ from the force data.

Clause 2. The system of Clause 1, further comprising the one or more force sensors.

Clause 3. The system of Clauses 1 or 2, further comprising one or both of the tool or the end effector.

Clause 4. The system of any of Clauses 1-3, wherein the tool is a drill.

Clause 5. The system of any of Clauses 1-4, wherein the one or more sensors comprise a first force sensor coupled to the tool, and a second force sensor coupled to the end effector.

Clause 6. The system of any of Clauses 1-5, further comprising a user interface having a display, wherein the control unit is further configured to show information regarding the expanded hole on the display.

Clause 7. The system of any of Clauses 1-6, further comprising a memory in communication with the control unit, wherein the force data are stored in the memory.

Clause 8. The system of any of Clauses 1-7, wherein the control unit is further configured to automatically operate the tool in response to determining that the expanded hole caused the deformation.

Clause 9. The system of any of Clauses 1-8, wherein the control unit is an artificial intelligence or machine learning system.

Clause 10. A method comprising:

receiving, by a control unit, one or more force signals from one or more force sensors coupled to one or both of a tool or an end effector, wherein the one or more force signals are indicative of one or more forces exerted in relation to the tool or the end effector as the tool operates on one or more components to form an expanded hole;

comparing, by the control unit, the one or more forces in relation to force data associated with a reference expanded hole that is aligned with an alignment hole of the one or more components; and determining, by the control unit, that the expanded hole caused a deformation when the one or more forces differ from the force data.

Clause 11. The method of Clause 10, wherein the tool is a drill.

Clause 12. The method of Clauses 10 or 11, further comprising showing, by the control unit, information regarding the expanded hole on a display of a user interface.

Clause 13. The method of any of Clauses 10-12, further comprising storing the force data in a memory in communication with the control unit.

Clause 14. The method of any of Clauses 10-13, further comprising automatically operating, by the control unit, the tool in response to said determining.

Clause 15. The method of any of Clauses 10-14, wherein the control unit is an artificial intelligence or machine learning system.

Clause 16. A system comprising:

a tool configured to form an expanded hole in a component;

an end effector;

one or more force sensors coupled to one or both of the tool or the end effector;

a control unit configured to:

receive one or more force signals from the one or more force sensors, wherein the one or more force signals are indicative of one or more forces exerted in relation to the tool or the end effector as the tool operates on the component to form an expanded hole, compare the one or more forces in relation to force data associated with a reference expanded hole that is aligned with an alignment hole of the one or more components, and determine that the expanded hole caused a deformation when the one or more forces differ from the force data; and a user interface having a display, wherein the control unit is further configured to show information regarding the expanded hole on the display.

Clause 17. The system of Clause 16, wherein the tool is a drill.

Clause 18. The system of Clauses 16 or 17, further comprising a memory in communication with the control unit, wherein the force data are stored in the memory.

Clause 19. The system of any of Clauses 16-18, wherein the control unit is further configured to automatically operate the tool in response to determining that the expanded hole caused the deformation.

Clause 20. The system of any of Clauses 16-19, wherein the control unit is an artificial intelligence or machine learning system.

Clause 21. A non-transitory computer-readable storage medium comprising executable instructions that, in response to execution, cause one or more control units comprising a processor, to perform operations comprising:

receiving one or more force signals from one or more force sensors coupled to one or both of a tool or an end effector, wherein the one or more force signals are indicative of one or more forces exerted in relation to the tool or the end effector as the tool operates on one or more components to form an expanded hole;

comparing the one or more forces in relation to force data associated with a reference expanded hole that is aligned with an alignment hole of the one or more components; and determining that the expanded hole caused a deformation when the one or more forces differ from the force data.

As described herein, examples of the present disclosure provide efficient, effective, and accurate systems and methods for identifying deformations in formed holes of components.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a control unit configured to:

receive one or more force signals from one or more force sensors coupled to one or both of a tool or an end effector coupled to the tool, wherein the one or more force signals are indicative of one or more forces exerted in relation to the tool or the end effector as the tool operates on one or more components to form an expanded hole, compare the one or more forces in relation to force data associated with a reference expanded hole that is aligned with an alignment hole of the one or more components, and determine that the expanded hole caused a deformation when the one or more forces differ from the force data.

2. The system of claim 1, further comprising the one or more force sensors.

3. The system of claim 1, further comprising one or both of the tool or the end effector.

4. The system of claim 1, wherein the tool is a drill.

5. The system of claim 1, wherein the one or more sensors comprise a first force sensor coupled to the tool, and a second force sensor coupled to the end effector.

6. The system of claim 1, further comprising a user interface having a display, wherein the control unit is further configured to show information regarding the expanded hole on the display.

7. The system of claim 1, further comprising a memory in communication with the control unit, wherein the force data are stored in the memory.

8. The system of claim 1, wherein the control unit is further configured to automatically operate the tool in response to determining that the expanded hole caused the deformation.

9. The system of claim 1, wherein the control unit includes is artificial intelligence.

10. A method comprising:

receiving, by a control unit, one or more force signals from one or more force sensors coupled to one or both of a tool or an end effector coupled to the tool, wherein the one or more force signals are indicative of one or more forces exerted in relation to the tool or the end effector as the tool operates on one or more components to form an expanded hole;

comparing, by the control unit, the one or more forces in relation to force data associated with a reference expanded hole that is aligned with an alignment hole of the one or more components; and determining, by the control unit, that the expanded hole caused a deformation when the one or more forces differ from the force data.

11. The method of claim 10, wherein the tool is a drill.

12. The method of claim 10, further comprising showing, by the control unit, information regarding the expanded hole on a display of a user interface.

13. The method of claim 10, further comprising storing the force data in a memory in communication with the control unit.

14. The method of claim 10, further comprising automatically operating, by the control unit, the tool in response to said determining.

15. The method of claim 10, wherein the control unit includes artificial intelligence.

16. A system comprising:

a tool configured to form an expanded hole in a component;

an end effector coupled to the tool;

one or more force sensors coupled to one or both of the tool or the end effector;

a control unit configured to:

receive one or more force signals from the one or more force sensors, wherein the one or more force signals are indicative of one or more forces exerted in relation to the tool or the end effector as the tool operates on the component to form an expanded hole, compare the one or more forces in relation to force data associated with a reference expanded hole that is aligned with an alignment hole of the one or more components, and determine that the expanded hole caused a deformation when the one or more forces differ from the force data; and a user interface having a display, wherein the control unit is further configured to show information regarding the expanded hole on the display.

17. The system of claim 16, wherein the tool is a drill.

18. The system of claim 16, further comprising a memory in communication with the control unit, wherein the force data are stored in the memory.

19. The system of claim 16, wherein the control unit is further configured to automatically operate the tool in response to determining that the expanded hole caused the deformation.

20. The system of claim 16, wherein the control unit includes is artificial intelligence.

21. The system of claim 1, wherein the end effector comprises a nose, and wherein an operative portion of the tool fits into and through the nose to operate on the one or more components.

22. The system of claim 1, wherein the expanded hole causes the deformation by being offset from a central longitudinal axis of the alignment hole by a predetermined tolerance.

* * * * *